(12) United States Patent
Sharp et al.

(10) Patent No.: US 8,612,527 B2
(45) Date of Patent: *Dec. 17, 2013

(54) AUTOMATIC NOTIFICATION SYSTEM AND PROCESS

(75) Inventors: Christopher Brooke Sharp, San Jose, CA (US); Brendan A. McCarthy, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 361 days.

This patent is subject to a terminal disclaimer.

(21) Appl. No.: 13/116,665

(22) Filed: May 26, 2011

(65) Prior Publication Data
US 2011/0231557 A1 Sep. 22, 2011

Related U.S. Application Data

(63) Continuation of application No. 12/042,307, filed on Mar. 4, 2008, now Pat. No. 7,953,808.

(51) Int. Cl.
*G06F 15/16* (2006.01)
*G06F 12/00* (2006.01)

(52) U.S. Cl.
USPC .......................................... 709/206; 709/207

(58) Field of Classification Search
USPC .................... 709/206–207, 225–229, 250
See application file for complete search history.

(56) References Cited

U.S. PATENT DOCUMENTS

| | | | |
|---|---|---|---|
| 6,546,425 B1 * | 4/2003 | Hanson et al. | 709/227 |
| 6,650,621 B1 * | 11/2003 | Maki-Kullas | 370/238 |
| 7,146,419 B1 | 12/2006 | O Rourke et al. | |
| 7,487,248 B2 * | 2/2009 | Moran et al. | 709/227 |
| 7,522,911 B2 * | 4/2009 | Ung et al. | 455/412.2 |
| 7,953,808 B2 * | 5/2011 | Sharp et al. | 709/206 |
| 2003/0005350 A1 | 1/2003 | Koning et al. | |
| 2004/0221035 A1 | 11/2004 | Morikawa | |
| 2004/0258072 A1 | 12/2004 | Deforche | |
| 2007/0050510 A1 | 3/2007 | Jiang | |
| 2007/0223408 A1 | 9/2007 | Thielke et al. | |
| 2008/0247348 A1 | 10/2008 | Wilson et al. | |
| 2009/0037443 A1 | 2/2009 | Athale et al. | |
| 2010/0077088 A1 | 3/2010 | Hyun et al. | |
| 2011/0128843 A1 | 6/2011 | Przybysz et al. | |

* cited by examiner

*Primary Examiner* — Zarni Maung
(74) *Attorney, Agent, or Firm* — Park, Vaughan, Fleming & Dowler LLP

(57) ABSTRACT

Receiving a notification message by a mobile subscriber can include establishing a session with a notification service; maintaining a persistent communication connection with the notification service after the session is established; subscribing to a node hosted by the notification service, wherein the node is pre-provisioned for use by a mobile subscriber; and receiving from the notification service a notification message corresponding to the subscribed node. Further, a message can be transmitted over the communication connection to the notification service at a predetermined interval and it can be determined whether the communication connection is viable. Additionally, it can be determined that the communication connection is no longer viable if no response is received from the notification service, the period of the predetermined interval can be decreased, and another session with the notification service can be established.

20 Claims, 5 Drawing Sheets

AUTOMATIC NOTIFICATION SYSTEM AND PROCESS

CROSS-REFERENCE TO RELATED APPLICATION

This application is a continuation of U.S. application Ser. No. 12/042,307, filed Mar. 4, 2008, entitled "Automatic Notification System and Process", which is hereby incorporated by reference.

The present disclosure relates to a notification system for notification message subscription in a networked environment.

BACKGROUND

An entity, such as an application or a device, can be configured to discover that an event of interest has occurred, such as a change in the status of another application or device. Further, the entity can take an appropriate action in response to the occurrence of the event of interest. As a result, the entity can be configured to automatically perform one or more actions in response to a state of an application or a device. For example, the entity can download and install a software patch in response to discovering that the software patch has been made available on an accessible server.

An entity can determine whether an event of interest has occurred by polling a corresponding event provider. For example, a change in the state of the event provider being polled can be interpreted as the occurrence of an event of interest. Through polling, the entity actively transmits one or more requests for information to the event provider. The event provider then responds with the requested information. Further, the polling can be performed periodically, such as at a predetermined interval. Thus, an event of interest can be detected within a predetermined amount of time after occurrence. Polling also can be performed in response to the occurrence of another event.

The occurrence of an event of interest also can be discovered through receipt of a notification message. The notification message can be sent directly from the event provider to the entity to indicate that an event of interest has occurred. In order to receive direct notification, however, the entity must be known to the event provider. Thus, the entity must register with each event provider from which notification messages are desired.

Alternatively, one or more notification messages can be distributed in accordance with a publish-subscribe model. In a publish-subscribe model, an event provider (or "publisher") publishes information to a notification service indicating that an event of interest has occurred. Further, the notification service can generate and transmit a corresponding event notification message to one or more entities (or "subscribers") that have subscribed to receive notification messages associated with the event of interest. In a publish-subscribe model, each of the subscribers registers with the notification service to receive messages corresponding to one or more nodes (or "topics"). Generally, a message associated with the publish-subscribe model can include a payload of data, such as additional data that provides history or contextual information. A notification message, however, can be formatted to omit the payload of data. Thus, a notification message can indicate the occurrence of an event of interest without the additional overhead and processing associated with a typical message in the publish-subscribe model.

A notification service can include multiple nodes (or "topics"), to which one or more publishers can publish information regarding events of interest. Multiple subscribers also can subscribe to notification messages associated with a particular node. Thus, a notification service can broadcast a notification message associated with a single publisher to multiple subscribers. Further, a subscriber can subscribe to event notifications associated with multiple publishers. Additionally, a notification service can be configured to manage access to the notification system by both publishers and subscribers. For example, the notification service can maintain subscription lists, authenticate publishers and subscribers that are requesting to open a session, and manage nodes to which information can be published.

The publish-subscriber model has been implemented to notify subscribers of a variety of events. For example, network accessible content sites, such as news sites and weblogs, commonly implement the publish-subscribe model to notify subscribers of new content. When a new item of content is available on the content site, a publisher associated with the content site can publish information to a corresponding node hosted at a notification service. The notification service can then transmit an event notification message to each of the subscribers subscribing to that node.

SUMMARY

A notification service can be configured to provide internet-wide event notification messages (or "notification messages") to multiple subscribers. Further, the notification service can be configured to enable the use of separate profiles or capabilities for subscribers associated with fixed devices and subscribers associated with embedded devices. For example, an embedded model can be implemented that provides selected functionality with reduced overhead and processing requirements. A fixed model also can be implemented that provides enhanced functionality to subscribers with greater computing or communications resources. Additionally, the notification service can implement a standard protocol such that information can be received from third-party publishers in a common, interoperable format. The notification service also can support connections from publishers and subscribers through multiple communication service providers and can communicate with publishers and subscribers operating on different operating systems.

The notification service also can support authentication, including mutual authentication, with both publishers and subscribers. For example, the notification service can require authentication before a requested session is opened. The notification service can utilize any authentication mechanism, including the PLAIN authentication mechanism or the PLAIN Simple Authentication and Security Layer ("SASL") authentication mechanism. In order to permit the notification service to host a variety of nodes associated with third-parties, the present inventors recognized the need to permit a new node to be automatically created (or "provisioned") at the notification service upon receipt of corresponding information from a publisher. Further, the present inventors recognized the need to also permit automatic discovery of the notification service.

The present inventors also recognized the need to permit content-based filtering of notification messages, such as notification messages associated with a particular node. Further, the present inventors recognized the need to restrict the type of payload that can be associated with a notification message. Additionally, the present inventors recognized the need to permit the notification service to redirect a payload associated with a notification message.

In general, in one aspect, the subject matter can be implemented to include establishing a session with a notification service; maintaining a persistent communication connection with the notification service after the session is established; subscribing to a node hosted by the notification service, wherein the node is pre-provisioned for use by a mobile subscriber; and receiving from the notification service a notification message corresponding to the subscribed node.

The subject matter also can be implemented such that establishing a session further comprises transmitting authentication information to the notification service over the persistent communication connection. Further, the subject matter can be implemented to include specifying a content-based message filter associated with the subscribed node. Additionally, the subject matter can be implemented such that the persistent communication connection is at least partially routed through a wireless communication provider.

The subject matter also can be implemented such that maintaining a persistent communication connection further includes transmitting a message over the communication connection to the notification service at a predetermined interval and determining whether the communication connection is viable. Further, the subject matter can be implemented such that the transmitted message comprises a ping. Additionally, the subject matter can be implemented to include determining that the communication connection is no longer viable if no response is received from the notification service, decreasing the period of the predetermined interval, and establishing another session with the notification service. The subject matter also can be implemented to include discovering the notification service through a service lookup.

In general, in another aspect, the subject matter can be implemented as a computer program product, encoded on a computer-readable medium, operable to cause data processing apparatus to perform operations comprising establishing a session with a notification service, maintaining a persistent communication connection with the notification service after the session is established, subscribing to a node hosted by the notification service, wherein the node is pre-provisioned for use by a mobile subscriber, and receiving from the notification service a notification message corresponding to the subscribed node.

The subject matter also can be implemented to be further operable to cause data processing apparatus to perform operations comprising transmitting authentication information to the notification service over the persistent communication connection. Further, the subject matter can be implemented such that the persistent communication connection is at least partially routed through a wireless communication provider. Additionally, the subject matter can be implemented to be further operable to cause data processing apparatus to perform operations comprising specifying a content-based message filter associated with the subscribed node.

The subject matter also can be implemented to be further operable to maintain the persistent communication connection by causing data processing apparatus to perform operations comprising transmitting a message over the communication connection to the notification service at a predetermined interval and determining whether the communication connection is viable. Further, the subject matter can be implemented such that the transmitted message comprises a ping. Additionally, the subject matter can be implemented to be further operable to cause data processing apparatus to perform operations comprising determining that the communication connection is no longer viable if no response is received from the notification service, decreasing the period of the predetermined interval, and establishing another session with the notification service. The subject matter also can be implemented to be further operable to cause data processing apparatus to perform operations comprising discovering the notification service through a service lookup.

In general, in another aspect, the subject matter can be implemented as a system comprising a communication network, a notification service coupled to the communication network, and a mobile subscriber device coupled to the communication network, the mobile subscriber device configured to perform operations comprising establishing a session with the notification service, maintaining a persistent communication connection through the communication network with the notification service after the session is established, subscribing to a node hosted by the notification service, wherein the node is pre-provisioned for use by the mobile subscriber device, and receiving from the notification service a notification message corresponding to the subscribed node.

In general, in one aspect, the subject matter can be implemented to include generating one or more pre-provisioned nodes for use by a mobile subscriber, establishing a session with the mobile subscriber, receiving a request from the mobile subscriber to subscribe to one of the one or more pre-provisioned nodes, and transmitting to the mobile subscriber a notification message corresponding to the subscribed node.

The subject matter also can be implemented such that establishing a session further comprises receiving authentication information from the mobile subscriber over a persistent communication connection. Further, the subject matter can be implemented to include associating a content-based message filter with the subscribed node. Additionally, the subject matter can be implemented to include conducting the session with the mobile subscriber over a communication connection that is at least partially routed through a wireless communication provider.

The subject matter also can be implemented to include receiving a message from the mobile subscriber at a predetermined interval and transmitting a response message to the mobile subscriber. Further, the subject matter can be implemented such that the transmitted message comprises a pong. Additionally, the subject matter can be implemented such that the notification service maintains security information corresponding to the one or more pre-provisioned nodes, the security information specifying one or more authorized subscribers. The subject matter also can be implemented to include assigning a session reference identifying the session with the mobile subscriber.

The techniques described in this specification can be implemented to realize one or more of the following advantages. For example, the techniques can be implemented such that a notification service can be automatically discovered by one or more subscribers and/or publishers. The techniques also can be implemented such that a notification service can include one or more pre-provisioned nodes. Further, the one or more pre-provisioned nodes can be adapted for use by an embedded device. The techniques further can be implemented to include maintaining a persistent communication connection between the notification service and a subscriber or a publisher. The persistent communication connection also can be adaptively managed to reduce the overhead associated with maintaining the persistent connection. Additionally, the techniques can be implemented to support publication by third-party publishers, including automatic node creation at the notification service upon receipt from a publisher of information corresponding to a new node.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

Figure 1:
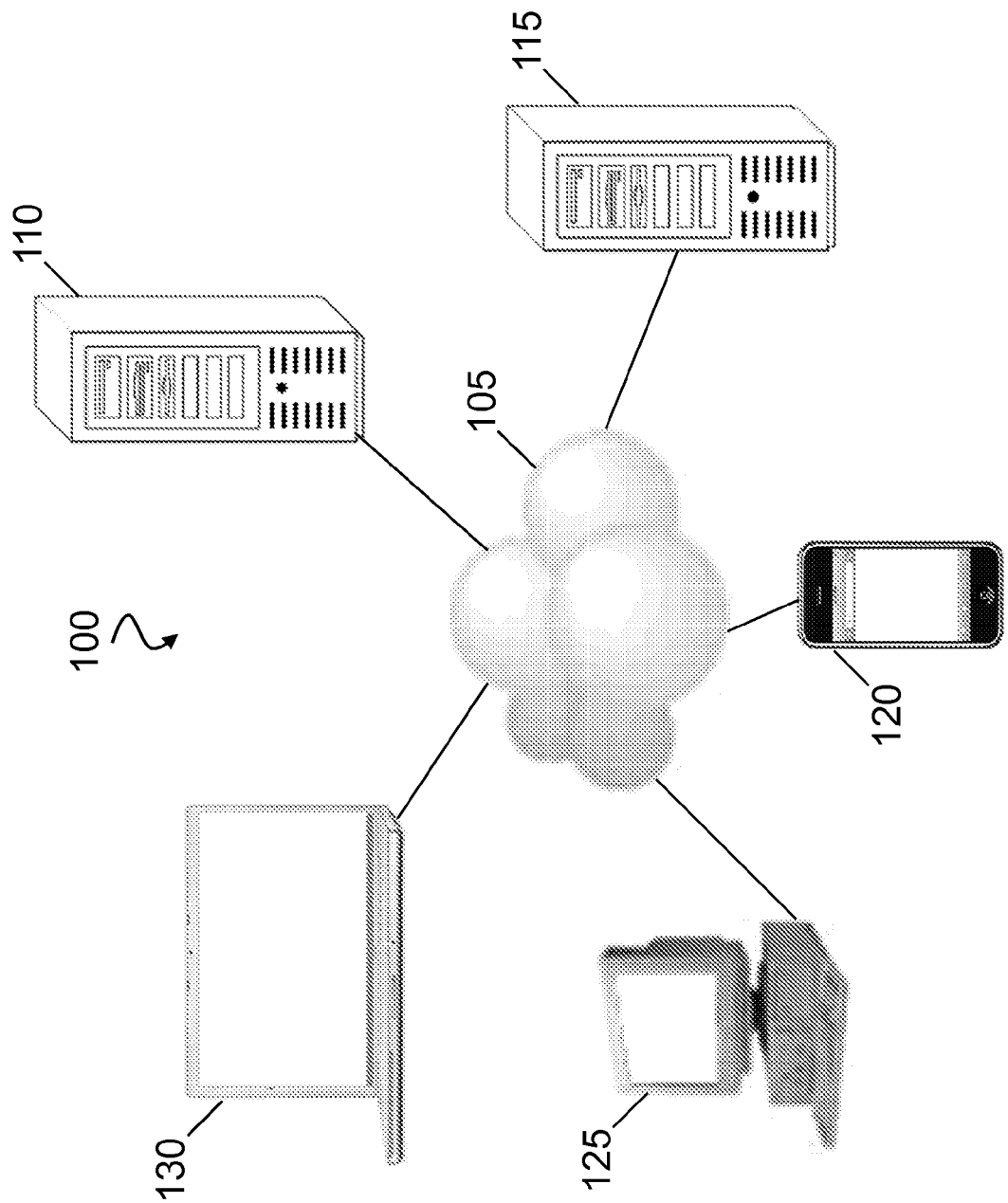
FIG. 1 shows an exemplary computing environment that includes a notification service.

FIG. 1 shows an exemplary computing environment 100 that includes a notification service. A communication network 105 connects the devices and applications hosted in the computing environment 100. The communication network 105 can be any type of network, including a local area network ("LAN"), such as an intranet, and a wide area network ("WAN"), such as the internet. Further, the communication network 105 can be a public network, a private network, or any combination thereof. The communication network 105 also can include wired communication paths and/or wireless communication paths associated with a plurality of service providers. Additionally, the communication network 105 can be configured to support the transmission of messages formatted using a variety of protocols.

A notification service 110 can be configured to operate in the computing environment 100. The notification service 110 can be hosted on a device configured to support interaction with a plurality of publishers and subscribers, such as a server or a workstation. In some implementations, the notification service 110 can be hosted on a virtual device comprised of multiple physical devices. Further, the notification service 110 can communicate bi-directionally over the communication network 105 with the one or more publishers and subscribers included in the computing system 100. For example, the notification service 110 can include one or more connections to the communication network 105 over which a variety of messages can be transmitted and received. In some implementations, the notification service 110 can be located in the open, such that any device operable to communicate over the communication network 105 can identify and communicate with the notification service 110. In other implementations, the notification service 110 can be located behind a firewall, such that communication with the notification service 110 by one or more devices can be controlled or restricted.

The notification service 110 also can include a defined namespace, which can be partitioned into any number of subtrees. For example, the notification service can have a first subtree designated as /public/ that can be used for general notification service accounts. The home directory /public/ 742ceba830 can be created for a client with the identifier 742ceba830@an.abc.com. The owner of a home directory can have control for all subtrees below that directory, including the ability to associate new child nodes and to publish and/or subscribe to any node below the home directory. The notification service also can have a second subtree designated as /protected/ that can be designated for other users, such as native accounts on the same domain as the notification service. One or more home directories corresponding to native accounts can be created under the /protected/ subtree. Other subtrees also can be created, such as /private/ or /reserved/. For example, the /reserved/ subtree (or "partition") can be used for server-to-server communications.

One or more publishers 115 also can be configured to operate in the computing environment 100. A publisher 115 can be hosted on any device capable of communicating notification information to the notification service 110. For example, the publisher 115 can be hosted on a server, a workstation, a desktop, a laptop, or a mobile computing device. Further, the publisher 115 can be configured to implement a fixed model (or "desktop model") for interaction with the notification service 110. In accordance with the fixed model, the publisher 115 can both subscribe to notification messages transmitted by the notification service 110 and publish information to one or more nodes associated with the notification service 110. Unless otherwise specified, node refers to a node appearing at any level within a hierarchy, including top-level nodes and sub-nodes. Additionally, the publisher 115 can be connected to the communication network 105 through a wired or wireless connection.

The computing system 100 further can include one or more subscribers. A subscriber can be hosted on any device capable of consuming notification messages received from the notification service 110. For example, a subscriber can be hosted on a mobile device 120, a desktop computer 125, or a laptop computer 130. Each subscriber can have a bi-directional connection to the notification service 110 through the communication network 105. Further, a subscriber can be configured to utilize the fixed model or an embedded model for interaction with the notification service 110. The fixed model can provide more functionality than is available through the embedded model, such as the ability to publish information to the notification service 110 and the ability to discover nodes not included in a predefined set. The embedded model can provide for a reduced memory footprint and lower complexity than the fixed model, such as through a reduced number of messages that the subscriber device must be able to process. For example, the desktop computer 125 can be configured to utilize the fixed model based on a determination that the desktop computer 125 has one or more of sufficient computing resources, a constant power supply, and a permanent connection to the communication network 105. Alternatively, the mobile device 120 can be configured to utilize the embedded model based on a determination that the mobile device 120 has one or more of restricted computing resources, a depletable power supply, and an impermanent connection to the communication network 105. Additionally, the laptop computer 130 can be configured to utilize either the fixed model or the embedded model based on an assessment of the currently available computing resources, power supply, and connection to the communication network 105. The subscriber also can be configured to dynamically switch the model being implemented based on one or more factors, such as the configuration of the subscriber device and the resources presently available to the subscriber.

The publishers and subscribers included in the computing environment 100 further can be assigned an identifier for use in messaging, such as a Jabber Identifier ("JID"). In some implementations the entities that interact with the notification service, including the publishers and subscribers, can be assigned an identifier that is associated with a common namespace. In other implementations, an identifier can be assigned to publishers and subscribers such that it corresponds to a particular device or application. Regardless of the naming convention, the identifier can be a unique value.

Further, different types or classes of identifier can be assigned. In an exemplary implementation, the types of identifier can include super-user, notification service account, native account, and pubsub service. A super-user identifier can be assigned to a node owner, such as a large-scale service provider. The super-user identifier can be generated in any way that can produce a unique value. For example, an identifier corresponding to a super-user named Solana.com can be generated by the function HEX(SHA1(super-solana)), where 'SHA1' indicates an implementation of the Secure Hashing Algorithm and 'HEX' indicates that the resulting SHA-1 digest is hexadecimal encoded. Further, the super-user identifier can be formatted as a JID by appending to the identifier the notification service domain, such as '@ns.abc.com'. A super-user can own all of the nodes included in one or more node hierarchies. Thus, additional security measures also can be enforced for a super-user, such as restriction on source-IP addresses or Transport Layer Security (TLS) verification.

A device, such as a mobile or resource limited device, can be assigned an identifier corresponding to a notification service account. For example, a notification service account and corresponding identifier can be automatically created when a device is registered with the notification service. The notification service account identifier also can be generated in any way that can produce a unique value. For example, a unique descriptor corresponding to the device, such as the Integrated Circuit Card ID ("ICCID") of a mobile telephone, can be input to the function HEX(SHA1(ICCID)) to produce the notification service account identifier. The notification service account identifier also can be formatted as a JID by appending to the identifier the notification service domain, such as '@ns.abc.com'.

An identifier associated with a native account, an account on the same domain as the notification service, also can be assigned to publishers and/or subscribers. In some implementations, the native account identifier can be structured as a JID based on a combination of ownership and resource information. For example, the mobile device 120 can be a network enabled smart phone owned by Joe, who has the electronic mail ("e-mail") account joe@abc.com. Thus, the native account identifier joe@ns.abc.com/Joes_Phone can be assigned for Joe's native account associated with the notification service. In some implementations, the notification service can automatically create one or more nodes that correspond to a native account, such as when the native account is created or the native account identifier is assigned. For example, nodes used to support sync and mail notifications can be automatically created under the home directory associated with a native account. Additionally, a pubsub identifier can be associated with a pubsub service.

In some implementations, a surrogate JID can be created for use with the notification service for third-party services that require a username and password. The surrogate JID assigned to a third-party service provider can be generated from a surrogate credential pair. Once the surrogate JID has been assigned, the third-party service provider can be linked to one or more nodes of the notification service. As a result, the third-party service provider, such as a web mail service provider, can implement push e-mail services to a notification service subscriber. Further, if authentication is not required or not available for third-party access to one or more nodes of the notification service, an anonymous subscription model can be supported.

Figure 2:
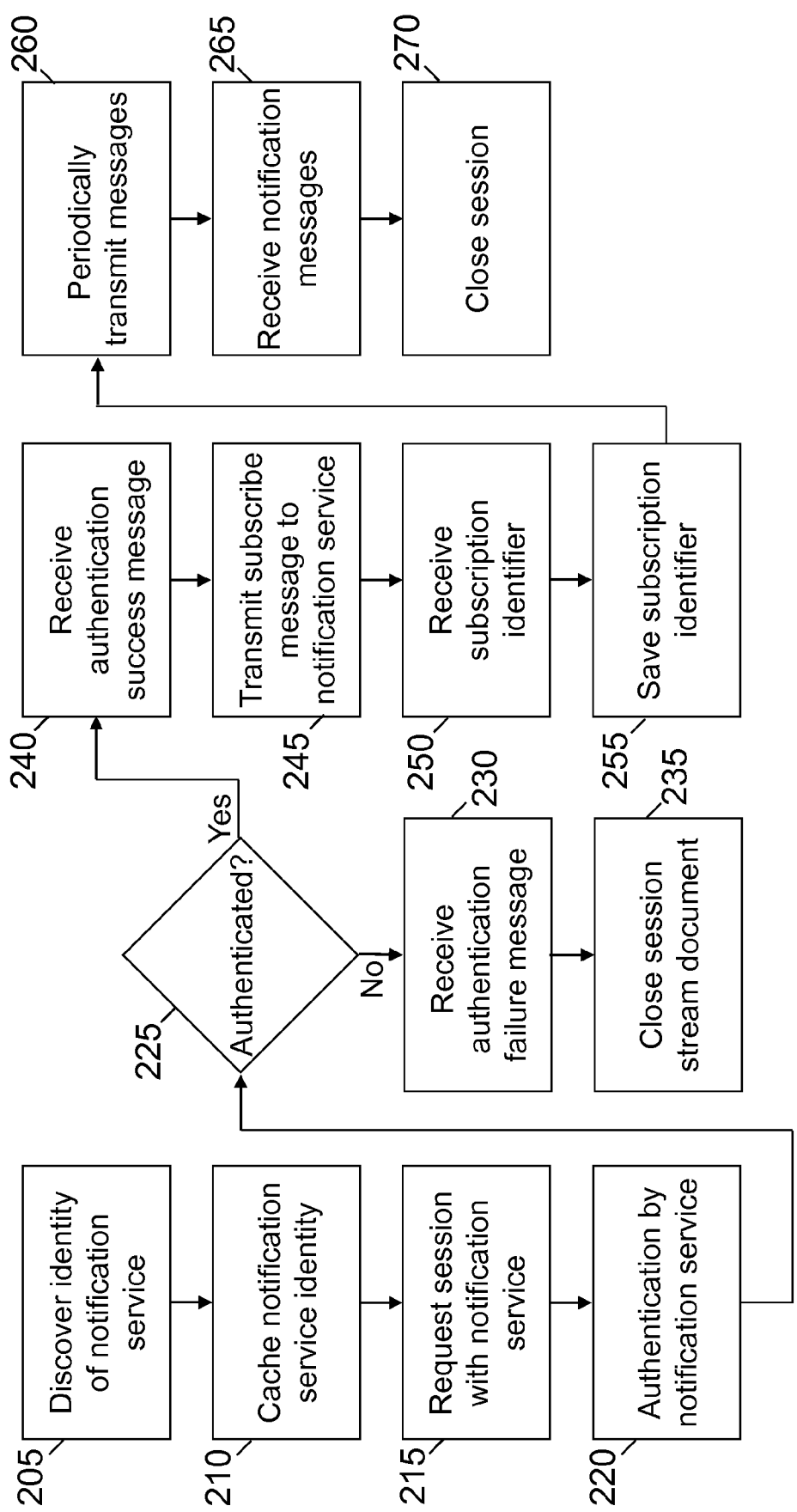
FIG. 2 shows a flowchart for subscribing to a node of interest by a subscriber.

FIG. 2 shows a flowchart for subscribing to a node of interest by a subscriber. Although this example is presented with respect to a subscriber, a publisher also can subscribe to one or more nodes associated with a notification service. A subscriber can discover the identity, such as the host and port, of a particular notification service (205). For example, the subscriber can perform an SRV (or "Service") lookup on the domain corresponding to the credential pair associated with the subscriber. For the subscriber joe@ns.abc.com/Joes_Phone, the SRV lookup can be performed on _xmpp-notification._tcp.abc.com. Further, if a credential pair is not available, a subscriber can be manually configured to look for a specific domain or to use the domain name of the localhost. The identity of the notification service, such as the result of the domain name lookup, also can be cached by the subscriber (210). Thus, the notification service can be subsequently contacted using the cached information. In some implementations, a subscriber also can implement negative caching to maintain a record of failed lookup results.

Once identified, the subscriber can request to open a session with the notification service (215). Further, the subscriber can begin the session by opening a new stream document, such as an extensible markup language ("XML") document. The stream document can remain open for the entire session, enabling information such as supported character sets to be transmitted once per session. Thus, entries can be appended to the stream document during the session as they are generated or received, instead of creating separate XML documents. The notification service also can begin a new session with the subscriber by opening a stream document associated with the session. Additionally, the notification service can authenticate the subscriber requesting the session (220). The notification service can implement any authentication mechanism that satisfies the security requirements of the system. For example, the notification service can implement the PLAIN authentication mechanism or the PLAIN SASL authentication mechanism. The notification service notifies the subscriber of the authentication mechanism in use once the requested session has been initialized. In response, the subscriber transmits the authentication information to the notification service.

The notification service evaluates the authentication information provided by the subscriber (225). If the notification service cannot validate the authentication information provided by the subscriber, the notification service transmits a message to the subscriber indicating that the authentication attempt has failed (230). Further, the subscriber and the notification service can close the stream document corresponding to the session (235). If the notification service can validate the authentication information, the notification service transmits a message to the subscriber indicating that the authentication was successful (240). A session reference also can be assigned to identify the session. Further, the subscriber can enter information into the stream document indicating successful authentication.

After authentication, the subscriber can transmit one or more subscribe messages to the notification service indicating one or more nodes of interest (245). A subscribe message can include the identifier associated with the subscriber and the node to which the subscriber would like to subscribe. For example, a subscribe message can indicate that the subscriber identified as joe@ns.abc.com is requesting a subscription to the node joe/sync. An exemplary subscribe message can specify:

```
<iq type='set'
    from='joe@an.abc.com/Joes_Phone'
    to='pubsub.an.abc.com'
    id='subscribe1'>
  <pubsub xmlns='http://jabber.org/protocol/pubsub'>
    <subscribe node='joe/sync/' jid='joe@an.abc.com/Joes_Phone'/>
  </pubsub>
</iq>
```

A node can support anonymous subscriptions, such that any entity can request a subscription. For example, a node corresponding to notification of software updates to an application can support anonymous subscriptions such that any application host can be informed of new software releases. Alternatively, a node can be controlled, such that only owners and/or approved subscribers can obtain a subscription. A whitelist can be maintained for a node, specifying one or more entities permitted to subscribe to that node. For example, a node corresponding to an e-mail account or private contact list can be restricted, such that only the registered owner can subscribe to the node.

Further, the node specified in a subscribe message can be a collection node, such that changes associated with the specified node and any sub-nodes will be reported in notification messages. For example, a subscription to the collection node joe/sync will result in notification messages being received for changes to that node and any sub-nodes, such as the sub-nodes joe/sync/com.abc.mail and joe/sync/com.abc.contacts. Alternatively, one or more nodes and/or sub-nodes can require a direct subscription. Additionally, the notification service can be configured to permit content-based filtering of notification messages associated with a node. For example, a subscriber can specify that notification messages associated with a node should be sent only for changes for which the subscriber is not the originator.

The notification service can respond to a subscription request by transmitting a subscription identifier to the subscriber (250). In some implementations, the notification service can restrict subscriptions to the owner associated with a node. In other implementations, the notification service can perform subscription management to determine whether a non-owner is permitted to subscribe to a node. Further, the subscriber can save the subscription identifier (255). For example, the subscriber can add an entry including the subscription identifier to the stream document maintained by the subscriber. Additionally, the notification service can be configured to control the nodes to which a subscriber can subscribe.

Further, the nodes available for subscription can be determined based on the notification model implemented by the subscriber. In some implementations, the notification service can pre-provision one or more nodes for use by subscribers implementing the embedded model. The pre-provisioned nodes also can be identified in the embedded model, such that subscriptions can be requested without first performing node discovery. For example, the notification service can pre-provision nodes such as 'username/mail' and 'username/sync' for use by subscribers implementing the embedded model. The pre-provisioned nodes further can be protected, such that they are not available for subscription by subscribers implementing a different model, such as the fixed model. In other implementations, the notification service can create an additional partition for nodes associated with the embedded model. For example, a 'private' partition can be created and a subscriber implementing the embedded model can subscribe to nodes such as '/private/username/sync'. Thus, node namespace conflicts between subscribers implementing the embedded model and subscribers implementing one or more other models, such as the fixed model, can be reduced or avoided.

While the session is active, the subscriber can periodically transmit a message to maintain the connection with the notification service (260). For example, the subscriber can transmit a ping message, such as an Extensible Messaging and Presence Protocol ("XMPP") ping, to the notification service. Further, the ping message can be transmitted at an interval that is short enough to prevent the connection with the notification service from being closed. If the notification service does not support the ping message, a subscriber can periodically transmit an XML presence stanza to the notification service. The presence stanza can be transmitted at the same interval as the ping message.

During the session, a subscriber also can receive one or more notification messages from the notification service (265). A notification message can indicate that an event of interest has occurred with respect to a subscribed node. The notification message also can indicate the nature of the event, such that the subscriber can determine whether to act on the notification message. For example, a notification message associated with a node for a software application can indicate that a new version of the application is available. If the subscriber determines that the new version already has been installed, the subscriber can ignore the notification.

Further, the subscriber can subscribe to additional nodes and receive notification messages associated with subscribed nodes at any time during the session. Additionally, the subscriber can close the current session at any time (270). For example, the subscriber can transmit a close stream message, such as </stream:stream>, to the notification service. The subscriber can then terminate the underlying connection with the notification service after sending the close stream message and the notification service can terminate the connection with the subscriber after receiving the close stream message.

Figure 3:
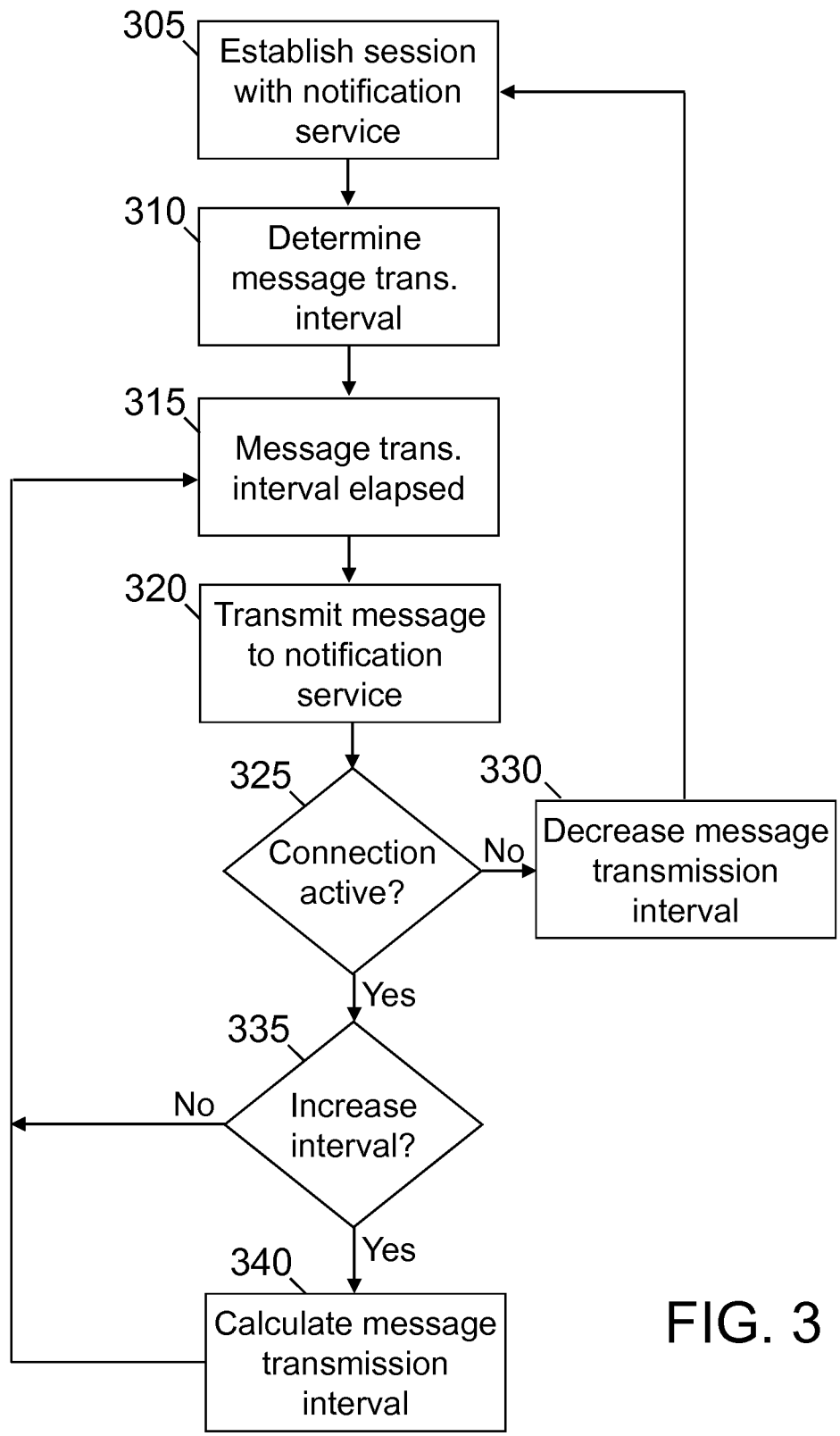
FIG. 3 shows a flowchart for periodically transmitting a message to maintain a persistent connection with the notification service.

FIG. 3 shows a flowchart for periodically transmitting a message to maintain a persistent connection with a notification service. Maintaining a persistent connection can reduce the amount of message traffic between a client and the notification service by reducing the number of times a session is initialized. A session can be established between the notification service and a client, which can be a subscriber or a publisher (305). For example, the client can connect to the notification service over a Transmission Control Protocol ("TCP") connection. In some implementations, the TCP connection can be made through a wireless service provider, such as a provider implementing the Enhanced Data rates for GSM Evolution (EDGE) or Enhanced General Packet Radio Service (EGPRS) protocol. Further, the client can implement either of the embedded model or the fixed model.

In order to maintain a persistent connection, the client and the notification service can be required to communicate within a predetermined periodic interval. If the client and the notification service communicate before the periodic interval expires, the periodic interval can be reset and the connection is maintained. Conversely, if the client and notification service do not communicate before the periodic interval expires, the connection can be terminated. Thus, the client can be periodically activated to transmit a message to the notification service. Additionally, the client can incorporate a wake-on-WAN implementation, such that the client can remain dormant during the period between transmitting messages to the notification service. If a notification message is received while the client is dormant, the client can evaluate the notification message to determine whether any action is required.

The client can determine a message transmission interval (310). If a current message transmission interval has been established, such as during the current session or a recent session, the current message transmission interval is selected. In some implementations, a current message transmission interval can be utilized for a predetermined amount of time, such as a period lasting one or more hours or days. In other implementations, a current message transmission interval can be utilized until a connection is lost.

Alternatively, a default message transmission interval can be selected. In some implementations, a global default message transmission interval can be specified. In other implementations, a default message transmission interval can be selected based on one or more factors, such as the communications service provider through which the connection has been made. For example, communications service provider ACME can utilize a periodic interval of approximately 31 minutes while communications service provider TELE can utilize a periodic interval of approximately 29 minutes. Thus, a default message transmission interval of 30 minutes can be associated with ACME, while a default message transmission interval of 28 minutes can be associated with TELE. The message transmission interval can be expressed in any format, including any combination of hours, minutes, and seconds.

The client also can determine when the message transmission interval has elapsed (315). For example, the client can maintain a counter or clock with a value that measures the message transmission interval. The value can be incremented or decremented until a period corresponding to the message transmission interval has elapsed. In some implementations, the counter or clock measuring the message transmission interval can be reset when a message is sent to or received from the notification service over the connection. For example, the message transmission interval can be reset when a subscription message is sent from the client to the notification service. In other implementations, the message transmission interval can be measured independently of other messages transmitted over the connection between the client and the notification service.

When the message transmission interval has elapsed, the client transmits a message to the notification service over the connection (320). In some implementations, the message transmitted to the notification service can be a ping message, such as an XMPP ping. An exemplary ping message can have the form:

```
<iq from='joe@an.abc.com/Joes_Phone' to='ns.abc.com'id=
   'j2o1'type='get'>
   <ping xmlns='urn:xmpp:ping'/>
</iq>
```

The notification service can respond to the ping message with a corresponding pong message. An exemplary pong message can have the form:
    <iq  from='ns.abc.com'  to  ='joe@an.abc.com/Joes_ Phone' id='j2o1' type='result'/>
The notification service also can respond to a ping with an error message indicating that the ping message is not supported. If the notification service does not support the ping message, the client can periodically transmit any other message type. The message transmitted can be of the request-response type to validate that the bi-directional connection between the client and the notification service remains viable. In some implementations, the client can be configured to transmit an XML presence stanza if the ping message is not supported. Transmission of the message resets the message transmission interval.

After transmitting the message, the client determines whether the connection is active (325). If the connection is no longer active, the message transmission interval is decreased (330). The amount by which the message transmission interval is decreased can vary based on one or more factors, such as the length of the message transmission interval and the communications service provider through which the connection has been made. For example, the message transmission interval can be decreased by a global default value, such as two minutes. Alternatively, the message transmission interval can be decreased by an amount specific to the service provider in use. In other implementations, the message transmission interval can be decreased by a predetermined amount based on the length of the current message transmission interval. The amount by which the message transmission interval is decreased can be a fixed value or a percentage of the current interval. By adaptively setting the message transmission interval, the client learns an interval that can be used to successfully maintain a persistent connection. Once determined, the current message transmission interval also can be stored. Further, the client can establish a new session with the notification service (305).

If the connection is still active, the client can determine whether to increase the message transmission interval (335). For example, the client can determine whether the current message transmission interval has been recently decreased or whether increasing the message transmission interval would cause it to exceed a default value. If the message transmission interval is to be increased, the client can calculate the current message transmission interval (340). The amount by which the message transmission interval is increased also can vary based on one or more factors, such as the length of the message transmission interval, one or more default or threshold values, and the communications service provider through which the connection has been made. For example, the message transmission interval can be increased by a global default value, such as one minute. Alternatively, the message transmission interval can be increased by an amount specific to the service provider in use. Further, the message transmission interval can have an upper-bound above which it cannot be increased. Once the current message transmission interval has been calculated, or if it is determined that the message transmission interval is not to be increased, the client once again can determine when the message transmission interval has elapsed (315).

Figure 4:
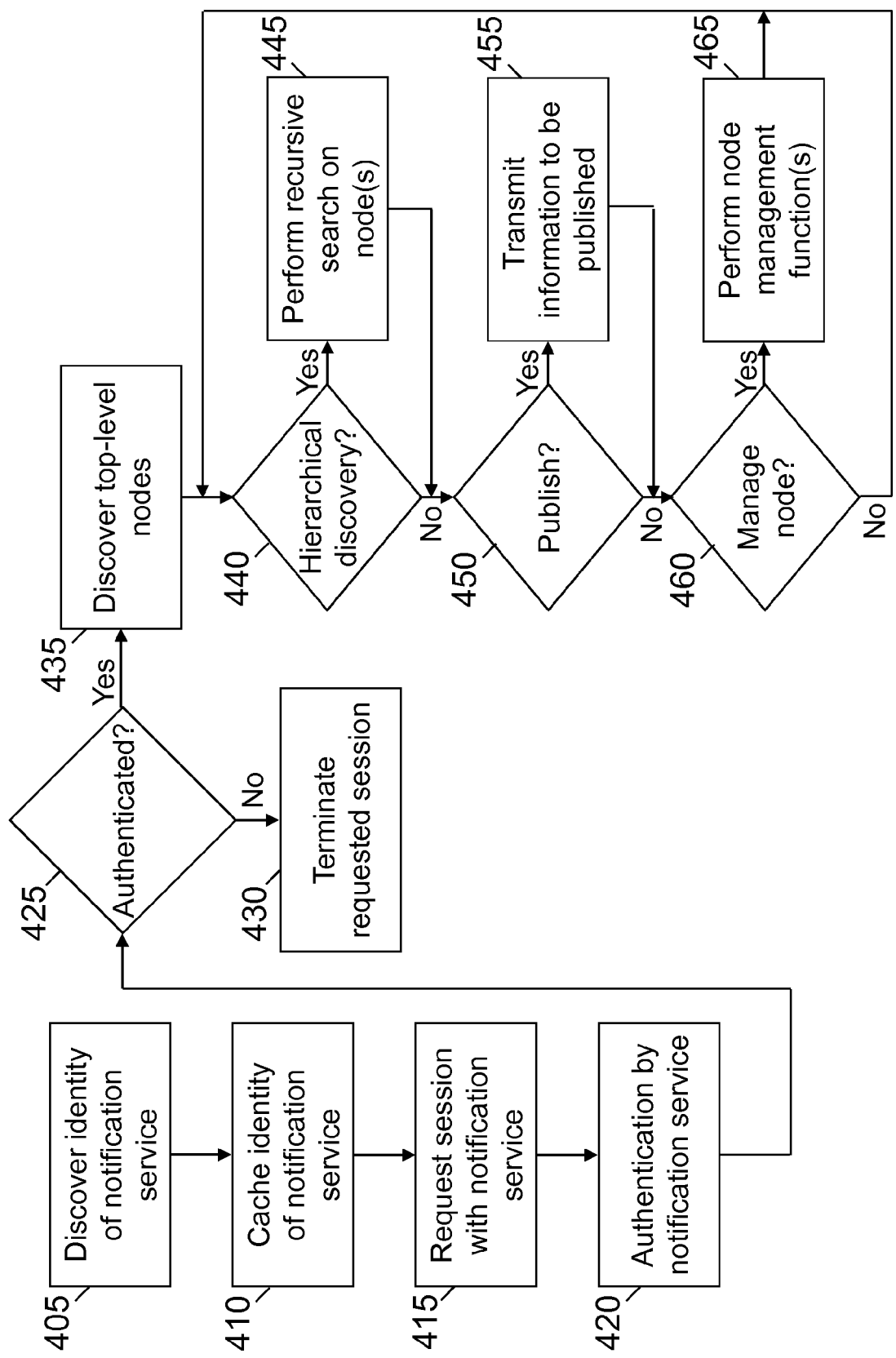
FIG. 4 shows a flowchart for discovering a node and publishing to a node.

FIG. 4 shows a flowchart for discovering a node and publishing to a node by a publisher. A publisher can discover the identity of a particular notification service (405). For example, the publisher can perform the discovery using an SRV lookup, as described above. Further, the identity of the notification service can be cached by the publisher (410). Thus, the notification service can be subsequently contacted by the publisher using the cached information. Once identified, the publisher can request to open a session with the notification service (415). The publisher also can open a new stream document to record entries associated with the requested session. In response, the notification service can authenticate the publisher requesting the session (420). The authentication process also can be performed as described above with respect to a subscriber. The notification service can evaluate the publishers authentication information (425). If the authentication fails, the requested session can be terminated (430). The notification service can transmit an authentication failure message to the publisher. Further, the stream document associated with the session can be closed and the connection terminated.

If the authentication is successful, the publisher can discover the top-level nodes available at the notification service (435). The publisher can transmit a request message to the notification service, identifying the node of interest. For example, the publisher can send a get message to 'pubsub.123.com/klau' requesting identification of the nodes associated with that namespace. In some implementations, the get message can include an XMPP 'disco#items' query. The notification service can respond to the get message with a result message that identifies one or more nodes associated with the specified namespace. For example, the result message can identify nodes such as 'sync' for sync services and 'mail' for e-mail. The publisher can cache the nodes identified in the result message. Alternatively, the publisher can attempt to optimistically subscribe to a desired node. If the node exists, the subscription can be implemented. If the publisher receives a failure message, the publisher can then implement node discovery.

After the top-level nodes have been discovered, the publisher can determine whether to perform discovery of the node hierarchy for one or more identified nodes (440). In discovering the node hierarchy, the publisher can perform one or more recursive searches to identify sub-nodes beneath the one or more identified nodes, such as the top-level nodes (445). The publisher can transmit a get message to the notification service, identifying a particular node for which any sub-nodes should be identified. For example, the get message can specify the top-level node 'sync'. In some implementations, the get message can include an XMPP 'disco#items' query. The notification service can respond to the get message with a result message that identifies one or more nodes associated with the 'sync' node in the specified namespace. For example, the result message can identify sub-nodes such as 'com.123.Contacts', 'com.123.Calendar', and 'com.123.Bookmarks' for the 'sync' node. The sub-nodes identified by the hierarchical discovery also can be cached.

The publisher also can determine whether to publish information to the notification service (450). If the publisher determines that information is available to be published, the publisher can transmit a message to the notification service including the information to be published and the node to which the information is to be published (455). For example, the publisher can specify an item, such as through an item identifier, that is to be published to the node username/sync/com.123.Contacts. The notification service can respond with a result message indicating that the identified item has been published to the specified node. In some implementations, if the node to which the information is to be published does not exist on the notification service, the node can be automatically created when the publication request is processed. For example, the notification service can automatically create the node 'username/sync/com.123.Contacts' if the node does not exist when the publication request is received. Also, in some implementations, the notification service can be configured to restrict the type of payload accepted in association with a publication message. In other implementations, the notification service can be configured to redirect the payload associated with a publication message to an alternate destination.

Additionally, the publisher can determine whether node management should be performed (460). The publisher can perform one or more node management functions, including the addition, deletion, or modification of a node (465). For example, the publisher can transmit a message to the notification service requesting the creation of a node. The message can specify information including the node to be created, such as 'username/sync/com.123.Contacts', the access model to be associated with the node, and the identity of one or more clients (publishers and/or subscribers) permitted to discover the node.

The publisher also can continue to determine whether any function, including discovery, publication, and management, is to be performed while the session with the notification service is open. Further, a publisher need not implement all of the functions described above. For example, the fixed model implemented by the publisher can incorporate all of the functions of the embedded model. Thus, a publisher can subscribe to one or more nodes and can consume notification messages associated with any subscribed nodes. Additionally, the fixed model can separately incorporate any or all of the discovery, publication, and management functions.

Figure 5:
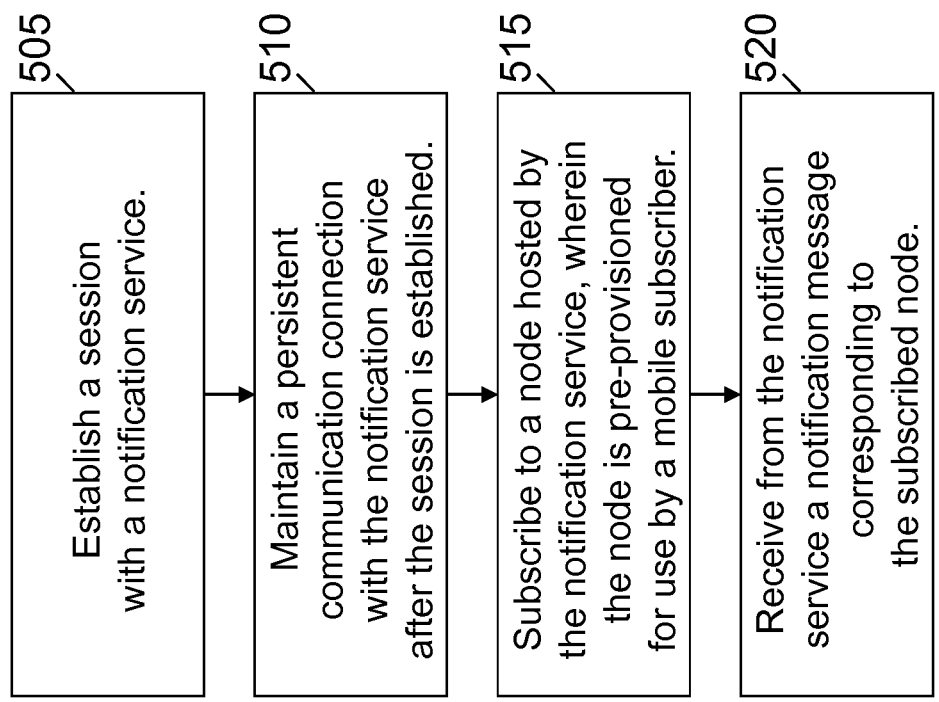
FIG. 5 shows a flowchart for receiving a notification message by a mobile subscriber.

FIG. 5 shows a flowchart for receiving a notification message by a mobile subscriber. Initially, a session is established with a notification service (505). A persistent communication connection is maintained with the notification service after the session is established (510). A node hosted by the notification service also is subscribed to, wherein the node is pre-provisioned for use by a mobile subscriber (515). Once the node has been subscribed to, a notification message corresponding to the subscribed node is received from the notification service (520).

A number of implementations have been disclosed herein. Nevertheless, it will be understood that various modifications may be made without departing from the spirit and scope of the claims. Accordingly, other implementations are within the scope of the following claims.

What is claimed is:

1. A method performed by one or more processes executing on a mobile electronic device, the method comprising:
    establishing, by the mobile electronic device, a session with a notification service system;
    maintaining, by the mobile electronic device, the established session with the notification service system at least in part by repeatedly transmitting messages to the notification service system, and
    receiving, from the notification service system, respective responses to the transmitted messages, said transmitting the messages and said receiving the respective responses occurring in alternate fashion such that the messages are transmitted to the notification service system only after receipt of responses from the notification service to respective previous messages;
    determining, by the mobile electronic device, that no response to a message transmitted by the mobile electronic device has been received from the notification service;
    re-establishing, by the mobile electronic device, the session with the notification service system in response to said determining; and
    maintaining, by the mobile electronic device, the re-established session with the notification service system at least in part by resuming said repeatedly transmitting the messages to the notification service system and said receiving the responses from the notification service system, the transmissions of the re-established session being repeated more frequently than the transmissions of the originally established session.

2. The method of claim 1, where the transmitted message comprises an Extensible Messaging and Presence Protocol (XMPP) ping.

3. The method of claim 1, where the transmitted message comprises an extensible markup language (XML) presence stanza.

4. The method of claim 1, where said repeatedly transmitting the messages to the notification service system is performed at time intervals that are equal to a predetermined time interval.

5. The method of claim 1, where said repeatedly transmitting the messages to the notification service system is performed at time intervals that increase, successively, starting from a first time interval equal to a predetermined time interval.

6. The method of claim 1, where said transmitting the messages and said receiving the respective responses occurring in alternate fashion comprises:
   transmitting a first message to the notification service system;
   receiving a first response to the transmitted first message from the notification service system; and
   transmitting a second message to the notification service system after said receiving the first response to the transmitted first message.

7. The method of claim 1, further comprising:
   discovering the notification service system through a service lookup;
   subscribing to a node hosted by the notification service system, where the node is pre-provisioned for use by a mobile subscriber; and
   receiving from the notification service system a notification message corresponding to the subscribed node.

8. The method of claim 7, further comprising specifying a content-based message filter associated with the subscribed node.

9. A non-transitory computer storage medium encoding instructions that when executed by data processing apparatus cause the data processing apparatus to perform operations comprising:
   establishing a session with a notification service system;
   maintaining the established session with the notification service system at least in part by
      repeatedly transmitting messages to the notification service system, and
      receiving, from the notification service system, respective responses to the transmitted messages, the operations of transmitting the messages and of receiving the respective responses occurring in alternate fashion such that the messages are transmitted to the notification service system only after receipt of responses from the notification service to respective previous messages;
   determining that no response to a message transmitted by the data processing apparatus has been received from the notification service;
   re-establishing the session with the notification service system in response to the determination; and
   maintaining the re-established session with the notification service system at least in part by resuming the operations of repeatedly transmitting the messages to the notification service system and receiving the responses from the notification service system, the transmissions of the re-established session being repeated more frequently than the transmissions of the originally established session.

10. The non-transitory computer storage medium of claim 9, where the transmitted message comprises an Extensible Messaging and Presence Protocol (XMPP) ping.

11. The non-transitory computer storage medium of claim 9, where the transmitted message comprises an extensible markup language (XML) presence stanza.

12. The non-transitory computer storage medium of claim 9, where the operation of repeatedly transmitting the messages to the notification service system is performed at time intervals that are equal to a predetermined time interval.

13. The non-transitory computer storage medium of claim 9, where the operation of repeatedly transmitting the messages to the notification service system is performed at time intervals that increase, successively, starting from a first time interval equal to a predetermined time interval.

14. The non-transitory computer storage medium of claim 9, where the operations of transmitting the messages and receiving the respective responses are performed in alternate fashion at least in part by
   transmitting a first message to the notification service system;
   receiving a first response to the transmitted first message from the notification service system; and
   transmitting a second message to the notification service system after said receiving the first response to the transmitted first message.

15. The non-transitory computer storage medium of claim 9, where the operations further comprise:
   discovering the notification service system through a service lookup;
   subscribing to a node hosted by the notification service system, where the node is pre-provisioned for use by a mobile subscriber; and
   receiving from the notification service system a notification message corresponding to the subscribed node.

16. The non-transitory computer storage medium of claim 15, where the operations further comprise specifying a content-based message filter associated with the subscribed node.

17. A mobile electronic device comprising:
   a data processing apparatus; and
   a non-transitory computer storage medium encoding instructions that when executed by the data processing apparatus cause the mobile electronic device to perform operations comprising:
   establishing a session with a notification service system;
   maintaining the established session with the notification service system at least in part by
      repeatedly transmitting messages to the notification service system, and
      receiving, from the notification service system, respective responses to the transmitted messages, the operations of transmitting the messages and of receiving the respective responses occurring in alternate fashion such that the messages are transmitted to the notification service system only after receipt of responses from the notification service to respective previous messages;
   determining that no response to a message transmitted by the mobile electronic device has been received from the notification service;
   re-establishing the session with the notification service system in response to the determination; and
   maintaining the re-established session with the notification service system at least in part by resuming the operations of repeatedly transmitting the messages to the notification service system and receiving the responses from the notification service system, the transmissions of the re-established session being repeated more frequently than the transmissions of the originally established session.

18. The mobile electronic device of claim 17, where the transmitted message comprises an Extensible Messaging and Presence Protocol (XMPP) ping or an extensible markup language (XML) presence stanza.

19. The mobile electronic device of claim 17, where
- the operation of repeatedly transmitting the messages to the notification service system is performed at time intervals that increase, successively, starting from a first time interval equal to a predetermined time interval, and
- the operations of transmitting the messages and receiving the respective responses are performed in alternate fashion at least in part by
  - transmitting a first message to the notification service system,
  - receiving a first response to the transmitted first message from the notification service system, and
  - transmitting a second message to the notification service system after said receiving the first response to the transmitted first message.

20. The mobile electronic device of claim 17, where the operations further comprise:
- discovering the notification service system through a service lookup,
- subscribing to a node hosted by the notification service system, where the node is pre-provisioned for use by a mobile subscriber,
- receiving from the notification service system a notification message corresponding to the subscribed node, and
- specifying a content-based message filter associated with the subscribed node.

* * * * *